No Printed Specification Available
6574X
J. P. FAIRLAMB & M. DUNOTT.
CRACKER MACHINE.
Patented June 13, 1831.
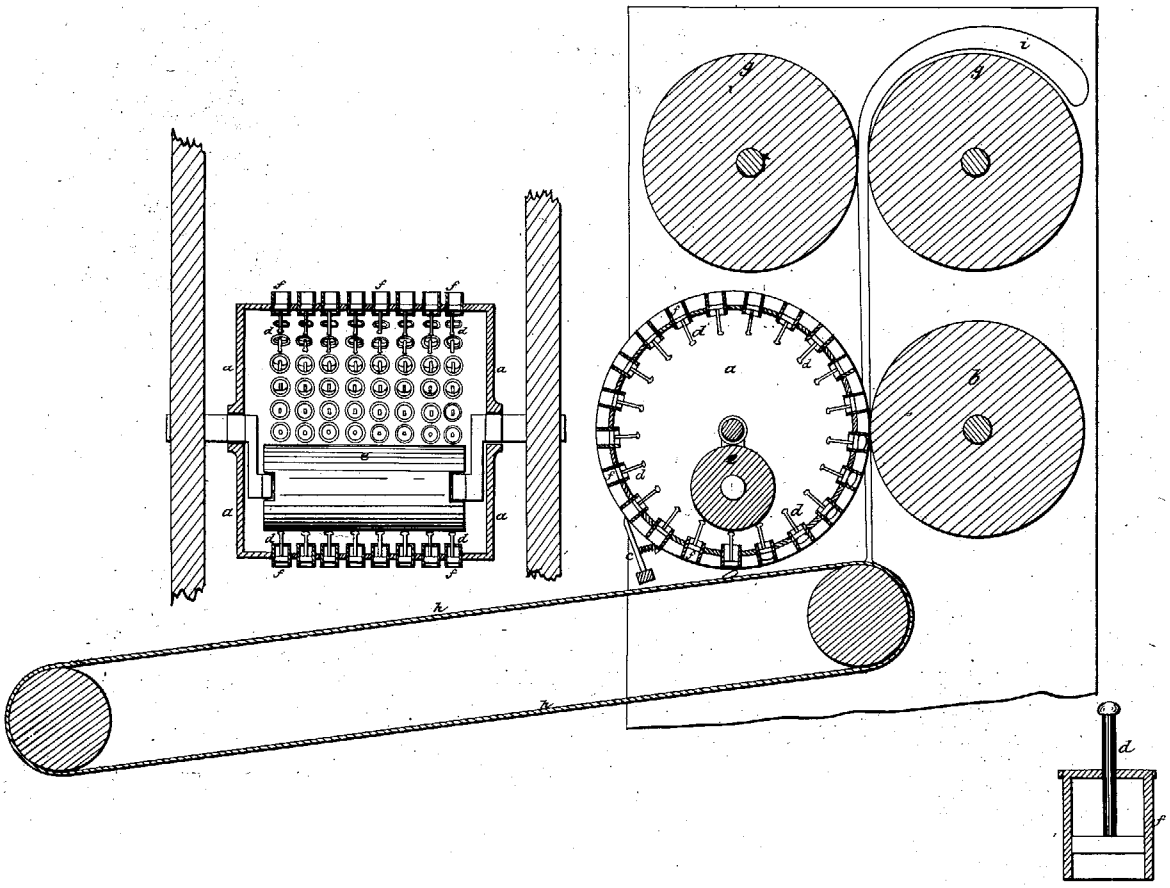

Jonas P. Fairlamb & Miller Dunott. 6574X

Letters Patent.

The Schedule referred to in these Letters Patent, and making
part of the same, containing a description in the words of the
said Jonas P. Fairlamb & Miller Dunot. themselves of their improve
ment for moulding and docking crackers, sea biscuit, cakes
and making Wafers.

We provide a cylinder, similar in form to the common
pulley used for belts, in the periphery or rim of which, we
insert, or attach the moulds, and another cylinder, with plain
periphery (which periphery may be sheet lead or other proper sub=
stance) both moveable, or revolving on their centres, and so
placed that the periphery of the plain cylinder, comes in con
tact with the face, or outer edge of the moulds, alternately, as
the cylinders revolve upon their centres, nearly at a right angle,
with a line parallel with the centres of the cylinders, and the
bottom and top points of their peripheries, causing nearly a
horizontal pressure, (this place of pressure may, however be in
varied to suit different arrangements, a stationary spring or
scraper, may be fixed alternately to come in contact with the
outsides of the Moulds, and admitting their faces to pass
clear of any obstruction thereby. from followers, that slide in
the moulds, like common followers in cylinders.) Shanks,
or Studs, extend the proper distance through the rim of the
cylinder, when the mould is full, on the inside of this rim.
is another cylinder, revolving when necessary, the diameter
less than the half diameter of the cylinder in which it revolves,
on its stationary centre. the periphery of which, comes in contact
with the ends of said Studs, or shanks, and thereby moves
the followers to the face of the moulds, and causes the end
[illegible]

6579X crackers, or contents of the moulds, alternately to fall, per-
pendicularly, upon a conductor, revolving around two
rollers, similar to those in common use – the dough must in
the first place be prepared as usual, then cut in slices, or made
in rolls of the proper size and consistency, it is then passed between
fixed rollers or cylinders, by which it is rolled to an equal & proper
thickness, to be received into the moulds, and conducted by a
constant motion, to the place of pressure into the moulds;
when received (or the necessary quantity) into the moulds,
it remains there until discharged, or expelled therefrom
as aforesaid, in proper forms as moulded, and is received
as afore mentioned upon the said conductor, or instead
of inserting the moulds in the aforesaid rim of a cylinder,
we insert them in links of a pitch chain, revolving as com-
mon pitch chains around two cylinders, or pitch wheels,
and to be operated on as aforesaid, by constructing the one
of those wheels, directly above the pressing cylinder, or so
nearly so, so as to admit the free passage of the said studs
or shanks of the followers, the other pitch wheel, operating
on the said studs, or shanks which pass through the pitch chain,
in the same manner as those passing through the rim of the
aforesaid cylinder are operated on, by the aforesaid small cylin-
der – The motion may be given to the cylinders, by any of the well
known powers, now in use, and must be equal surface motion,
the face, or extreme edge of the moulds, being considered the
surface of the cylinder, to which they are attached, or pass
around. We therefore claim the exclusive right and benefit of
moulding and docking crackers, sea biscuits, cakes, and making
wafers, by cylindrical pressure, and such other parts of the
aforesaid Machinery, as are not known or in use. In wit-
ness whereof we have hereunto set our hands, this sixth day of April in
the year of our Lord, one thousand eight hundred and thirty one.

Witness, James Jordan — Jonas P. [illegible]
Albert A. Higgins — Miller Bennett